US007627864B2

(12) United States Patent
Du et al.

(10) Patent No.: US 7,627,864 B2
(45) Date of Patent: Dec. 1, 2009

(54) MECHANISM TO OPTIMIZE SPECULATIVE PARALLEL THREADING

(75) Inventors: Zhao Hui Du, Shanghai (CN); Tin-fook Ngai, Santa Clara, CA (US); Chu-cheow Lim, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 933 days.

(21) Appl. No.: 11/167,409

(22) Filed: Jun. 27, 2005

(65) Prior Publication Data
US 2007/0011684 A1 Jan. 11, 2007

(51) Int. Cl.
G06F 9/45 (2006.01)
G06F 15/00 (2006.01)

(52) U.S. Cl. .................. 717/151; 717/152; 717/153; 717/154; 717/156; 717/159; 717/149; 717/140; 712/216

(58) Field of Classification Search ................ 717/151, 717/152, 153, 154, 156, 159, 149, 140; 712/216
See application file for complete search history.

(56) References Cited

U.S. PATENT DOCUMENTS

| | | | | |
|---|---|---|---|---|
| 5,724,565 A * | 3/1998 | Dubey et al. | ............... | 712/245 |
| 5,812,811 A * | 9/1998 | Dubey et al. | ............... | 712/216 |
| 5,913,925 A * | 6/1999 | Kahle et al. | ................ | 717/151 |
| 6,374,403 B1 * | 4/2002 | Darte et al. | ................ | 717/151 |
| 6,625,725 B1 * | 9/2003 | Wu et al. | ..................... | 712/245 |
| 6,931,514 B2 * | 8/2005 | Shibayama et al. | ......... | 712/216 |
| 7,010,787 B2 * | 3/2006 | Sakai | ......................... | 717/159 |
| 7,082,601 B2 * | 7/2006 | Ohsawa et al. | .............. | 717/149 |
| 7,458,065 B2 * | 11/2008 | Sanchez et al. | ............. | 717/140 |
| 2004/0103410 A1 * | 5/2004 | Sakai | ......................... | 717/146 |
| 2004/0154010 A1 * | 8/2004 | Marcuello et al. | ........... | 717/158 |
| 2004/0194074 A1 * | 9/2004 | Shibayama et al. | ......... | 717/151 |

OTHER PUBLICATIONS

Marcuello, et al. "Thread-Spawning Schemes for Speculative Multithreading", 2002, IEEE, p. 1-10.*
Bhowmik, et al. "A General Compiler Framework for Speculative Multithreading", 2002, ACM, p. 99-108.*
U.S. Appl. No. 10/794,052, filed Mar. 8, 2004, Du et al.
U.S. Appl. No. 10/778,545, filed Feb. 17, 2004, Lim et al.
T.N. Vijaykumar. Compiling for the Multiscalar Architecture. PhD Thesis. Computer Science Department, University of Wisconsin at Madison, Jan. 1998, p. 1-208.
A. Bhowmik and M. Franklin, "A General Compiler Framework for Speculative Multithreading", Proceedings of the 14th annual ACM symposium on parallel algorithms and architectures, Winnipeg, Manitoba, Canada, 2002, p. 1-14.
T.A. Johnson et al., "Min-cut program decomposition for thread-level speculation", Proceedings of the ACM SIGPLAN 2004 conference on programming language design and implementation, Washington D.C., 2004, p. 1-37.

* cited by examiner

*Primary Examiner*—Qamrun Nahar
(74) *Attorney, Agent, or Firm*—Blakely, Sokoloff, Taylor & Zafman LLP (57) ABSTRACT

A method to optimize speculative parallel thread execution comprises selecting a plurality of partition candidate pairs for speculative parallel thread execution, transforming each partition candidate pair of the plurality of partition candidate pairs to improve the expected performance gain of each pair, and selecting a set of one or more transformed partition candidate pairs that do not interfere with each other and produce a maximum expected performance gain.

20 Claims, 8 Drawing Sheets

```
1   M = master region; G = VC dependence graph
2
3   {
4       1. Enumerate vertices in G in topological order
5          *if v depends on u in M, directly or indirectly, then u < v*
6       2. Compute the allowed maximum pre-fork region size, Smax
7       3. Initialize P_opt=unknown, C_opt=infinite
8          *P_opt is the best partition found, while C_opt is the corresponding re-execution
9          ratio*
10      4. Start with root partition P={ {},V(G)}
11         i.e., the partition with empty pre-fork region*
12         *V(G) is the set of vertices in G*
13         PreFork(P) and PostFork(P) are the first and second element of this 2-tuple,
14         respectively.
15      5. Visit a partition P and determine the best partition (P_best) reachable from P and
16         its re-execution ratio (C_best)
17             a. If Size(Prefork(P)) > Smax, return (null, infinite) to P's parent partition.
18                *This step prunes the search*
19             b. Compute the re-execution ratio (C_least) due to all vertices c in the
20                PostFork(P) where v has a lower topological order number than a vertex in
21                PreFork(P).
22                *In other words, these vertices will never be moved into the pre-fork
23                region for all partitions after P in this search path.*
24                *C_least constitutes a lower bound of the re-execution ratios of all
25                descendent partitions generated from P*
26                     i. If C_least > C_opt, return (null, infinite) to P's parent partition
27                        *This step prunes the search*
28             c. Computer P's re-execution ratio, Cost(P)
29             d. Initialize P_best = P, C_best = Cost(P)
30             e. Recursively visit the child partitions: For each vertex v in Post Fork(P)
31                that has a higher topological order number than any vertex in PreFork(P)
32                and whose predecessors are all in PreFork(P),
33                     i. Create a new partition P' = {preFork(P) U {v}, PostFork(P) −{v} }
34                     ii. Go to Step 5 to visit P' recursively to obtain the best partition and
35                         its re-execution ratio (P", C") along this search path
36                     iii. If C" < C_best, set C_best = C" and P_best = P"
37             f. If C_best < C_opt, set C_opt = C_best and P_opt =P_best
38             g. Return (P_best, C_best) to P's parent partition
39      6. Return P_opt and C_opt
40  }
```

FIG. 5

```
1    b = Foo():
2    if (b) {
3        Bar (i+b):
4    }
```

```
1    /*master region*/
2    b = 1;
3    SPT_fork(thread_bar);
4    b = Foo();
5    if (b! = 1) SPT_kill(thread_bar);
6    if (b) {
7        /*speculative region*/
8        thread_bar:    Bar (i+b);
9                       SPT_join (thread_bar);
10   }
```

MECHANISM TO OPTIMIZE SPECULATIVE PARALLEL THREADING

FIELD OF THE INVENTION

The embodiments of the invention relate generally to compilers and, more specifically, relate to optimizing speculative parallel thread execution.

BACKGROUND

Speculative computing methods may provide greater computing efficiency. In such methods, sections of a sequential computing task may be carried out in parallel according to a "guess" as to how the computing task will proceed. Examples of such speculative computing methods include speculative parallel thread (SPT) compilation and speculative parallel thread (SPT) program execution.

One aspect of performing speculative computing is the prediction of when a particular path should be taken in a computing task. For example, a program may contain several different points at which it may proceed to execute a speculative thread. In speculative computing, the predictions of which regions to speculatively execute during a computing task may effect the efficiency of the computing. The more spurious the predictions are, the less efficient the computing becomes.

An original listing of code may be transformed for SPT execution. This original listing is split into master and speculative threads. A master thread is the primary section of program code that initiates execution of the speculative thread. A speculative thread is the secondary set of code speculatively executed in parallel with the master thread. An ideal partition of master and speculative regions will have no data dependence between the two threads, the threads will have the same size, and the probability of reaching the instruction beginning the speculative thread from the master thread is 1 (i.e., the execution of the master regions always ends at the beginning of the speculative region).

However, most programs do not consist of only ideal partitions of master and speculative threads. In some cases, two code sections may be almost data-independent or their data-independence may be too difficult for a compiler to verify. When such pairs of code sections are speculatively executed in parallel in the SPT model, and a data dependence violation happens during the speculative parallel execution, the master thread must re-execute the speculative thread. If too many dependence violations occur, the cost for re-execution is high and there may be little to no performance gains, or possibly a performance loss.

In order to maximize performance gain, it is beneficial to reduce the expected re-execution cost. The re-execution cost can be reduced by selecting master and speculative threads with a low probability of data dependence between the two threads. Transforming the code so that the data dependence probability between the two threads is a low value may also reduce the re-execution cost. Conventional speculative parallel region algorithms select speculative parallel regions primarily based on control flow independences/probabilities and generate the speculative code after the speculative regions are selected. However, no algorithms apply code transformation and optimization during speculative parallel region selection to generate an optimal set of SPT regions that maximizes the expected overall performance of the code execution.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 4 illustrates one embodiment of pseudo-code to transform master and speculative regions for optimal speculative parallel thread execution;

DETAILED DESCRIPTION

A method and apparatus to optimize speculative parallel thread execution are described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the embodiments of the invention may be practiced without these specific details. In other instances, well-known structures and devices are shown in block diagram form, rather than in detail, in order to avoid obscuring the invention.

Embodiments of the invention provide an algorithm to transform a sequential code of arbitrary control flow for speculative parallel thread (SPT) execution. The algorithm selects and forms optimal speculative parallel regions.

Figure 1:
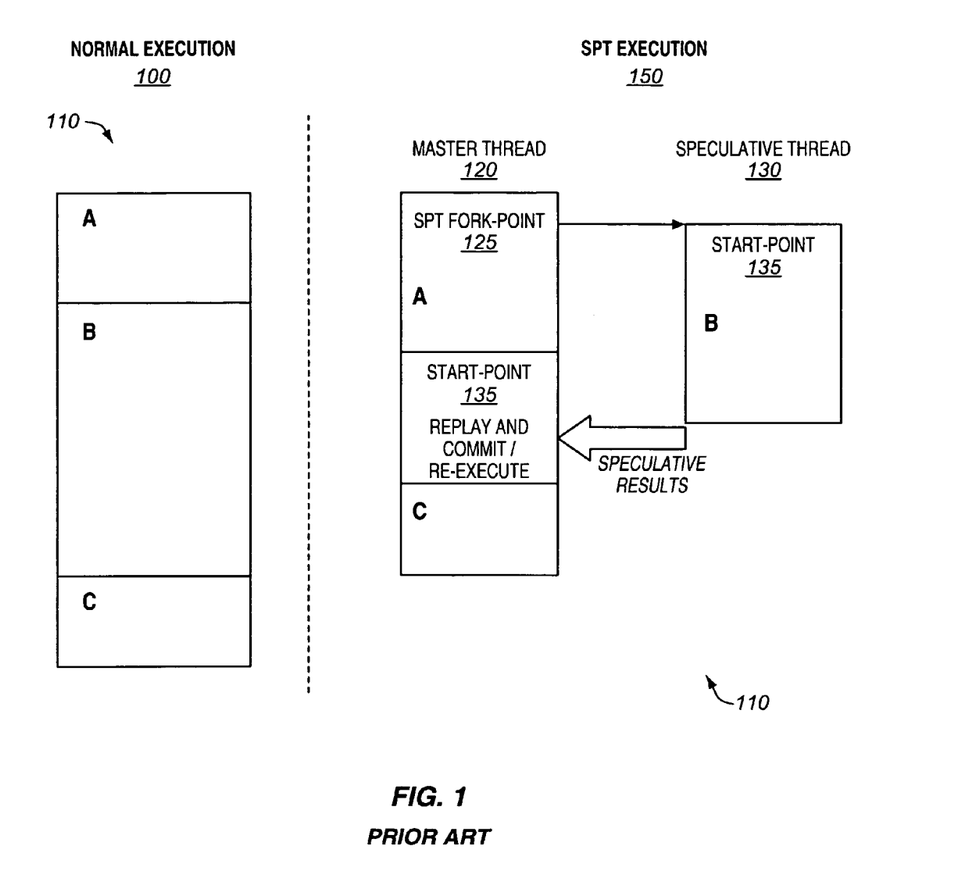
FIG. 1 illustrates one embodiment of a conventional speculative parallel thread execution model.

FIG. 1 illustrates a conventional SPT execution model. An instruction sequence 110 is shown during normal execution 100. Three code sections, A, B, C, are executed in sequential order. The instruction sequence 110 is also shown for a system implementing a SPT execution 150. During SPT execution 150, the master thread 120 executes a SPT fork instruction 125. This fork instruction 125 will spawn a speculative parallel thread 130 that starts executing the code section B speculatively at the starting instruction address specified by the SPT fork instruction. The location of the fork instruction 125 is the fork-point, and the address of the starting instruction 135 specified by the fork is the start-point. As illustrated, code section B is the speculative parallel thread 130. A fork instruction 125 is placed before the code section A that specifies the instruction starting code section B as the start point for speculative execution.

The speculative parallel thread 130 will copy the context of the master thread 120 when it starts its execution. A replay buffer is used to save the results of the speculative thread. When the master thread reaches the start-point (i.e., starting instruction 135), it will replay the results of the speculative execution and check for any dependence violation during the speculative execution. Any correctly-executed results are committed. However, if the speculative results are incorrect due to a dependence violation, the master thread 120 will re-execute the corresponding instructions.

The master thread 120 will join the speculative parallel thread 130 at the end of the code section B. At this point, the speculative parallel thread 130 is terminated and the master thread 120 continues with normal execution. Depending on the hardware support and implementation, the master thread may selectively re-execute the portions of the speculative code that had dependence violations or the master thread may re-execute the whole section of speculative code whenever any dependence violation is encountered.

In order for a sequential program to obtain performance gains from an SPT execution model, the optimal locations in the program for pairs of fork-point, start-point (F, S) instructions should be identified. In this description, a pair of (F, S) instructions will be referred to as a "partition candidate." The addresses of the fork-point and start-point determine the start of the master and speculative regions, respectively. A "master region" is defined as the sections of code that may be executed by the master thread before it joins the speculative thread. A "speculative region" is defined as the section of code that may be executed by the speculative thread before it joins the master thread.

Similarly, the "master region size" is defined as the expected execution time (e.g., in cycles) spent by the master thread before it joins the speculative thread. The "speculative region size" is defined as the expected execution time (e.g., in cycles) spent by the speculative thread before it joins the master thread. An SPT region can be either a master or a speculative region.

An ideal partition candidate is one where the master and speculative regions have no data dependence, the sizes of these regions are the same, and the probability of reaching start-point S from fork-point F is 1 (i.e., the execution of the master regions always ends at the beginning of the speculative region). With regard to the sizes of the master and speculative regions, the following are criteria for good partition candidates:

(1) For each partition candidate, the sizes of the master region and speculative regions should be almost the same so that their join time is reduced (i.e., they do not need to wait for each other for too long a time).
(2) The size of both regions is greater than a minimum threshold (which depends on the architecture) as there is overhead to fork a thread. If the sizes are too small, the performance gain from parallel execution will not be enough to offset the cost of forking a thread.
(3) The sizes of both regions should not be too large as to exceed a hardware support limit. The SPT hardware support may implement a buffer to hold the results of the speculative thread (e.g., in the replay/re-execution SPT model described with respect to FIG. 1). The physical size of the buffer may limit the size of the speculative region to be executed.

Figure 2:
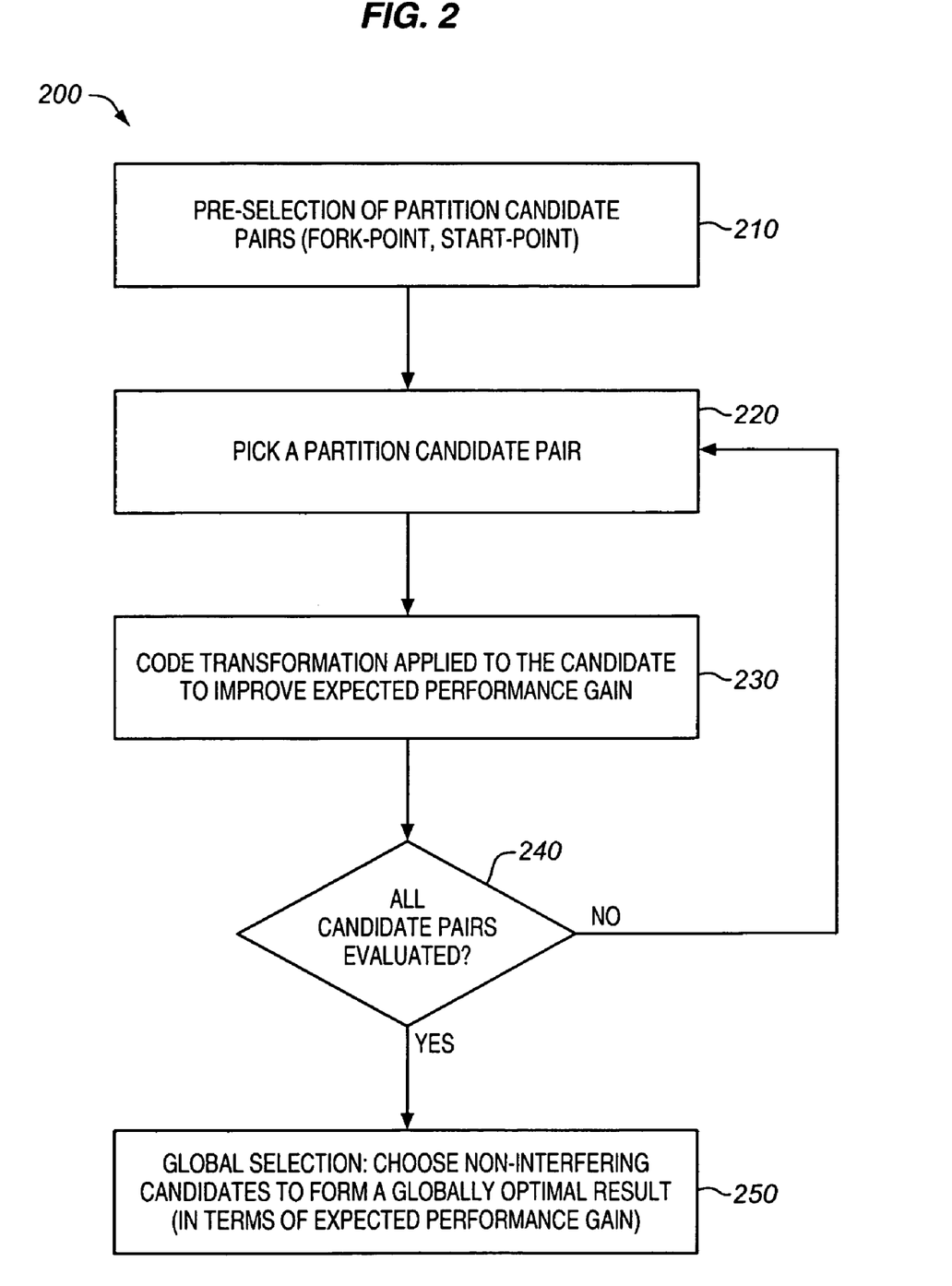
FIG. 2 illustrates a flow diagram of one embodiment of a method to optimize speculative parallel thread execution.

FIG. 2 illustrates a flow diagram of one embodiment of a method to be implemented in a compiler to find all the pairs of (F, S) instructions resulting in optimal speculative execution of a program. The goal of the algorithm 200 is to find a maximal set of optimal partition candidates so that the expected overall performance gain is maximized. There are three major phases in the optimization.

The first major phase, at processing block 210, is a selection phase to select all (F, S) partition candidates for transformation and optimization. This selection selects those (F, S) pairs whose reaching probabilities (i.e., the control flow probability from F to S) is high and exceeds a minimum threshold. The choice of threshold is system-dependent. Then, at processing block 220, a partition candidate pair that has been selected is chosen for evaluation.

The second major phase, at processing block 230, is to transform and optimize the chosen partition candidate. The code of the partition candidate may be transformed in both the master and speculative regions to reduce re-execution cost and improve performance gain.

In one embodiment, the optimal transformation of each partition candidate may be determined by estimation of a re-execution ratio. The re-execution ratio is the probability that a speculatively executed instruction in the speculative region needs to be re-executed. The re-execution ratio may be estimated by dividing the expected number of instructions in the speculative region to be re-executed by the expected total number of instructions executed in the speculative region. In the SPT model, if the entire speculative region is re-executed on misspeculation, then the re-execution ratio may be estimated by the probability of misspeculation.

At decision block 240, it is determined whether all selected partition candidate pairs from the first phase have been evaluated. If not the process returns to processing block 220 to select another partition candidate pair for transformation. If all pairs have been evaluated, the process continues to processing block 250.

The third major phase, at processing block 250, is to identify a subset of the partition candidates from the set of partition candidates after transformation. This identification selects the set of partition candidates that maximize the expected overall performance gain.

The process outlined above with respect to FIG. 2 will now be described in more detail. More specifically, selection of SPT region candidates, optimal transformation of each partition candidate, and selection of the optimal set of transformation partition candidates will be described below.

Figure 3:
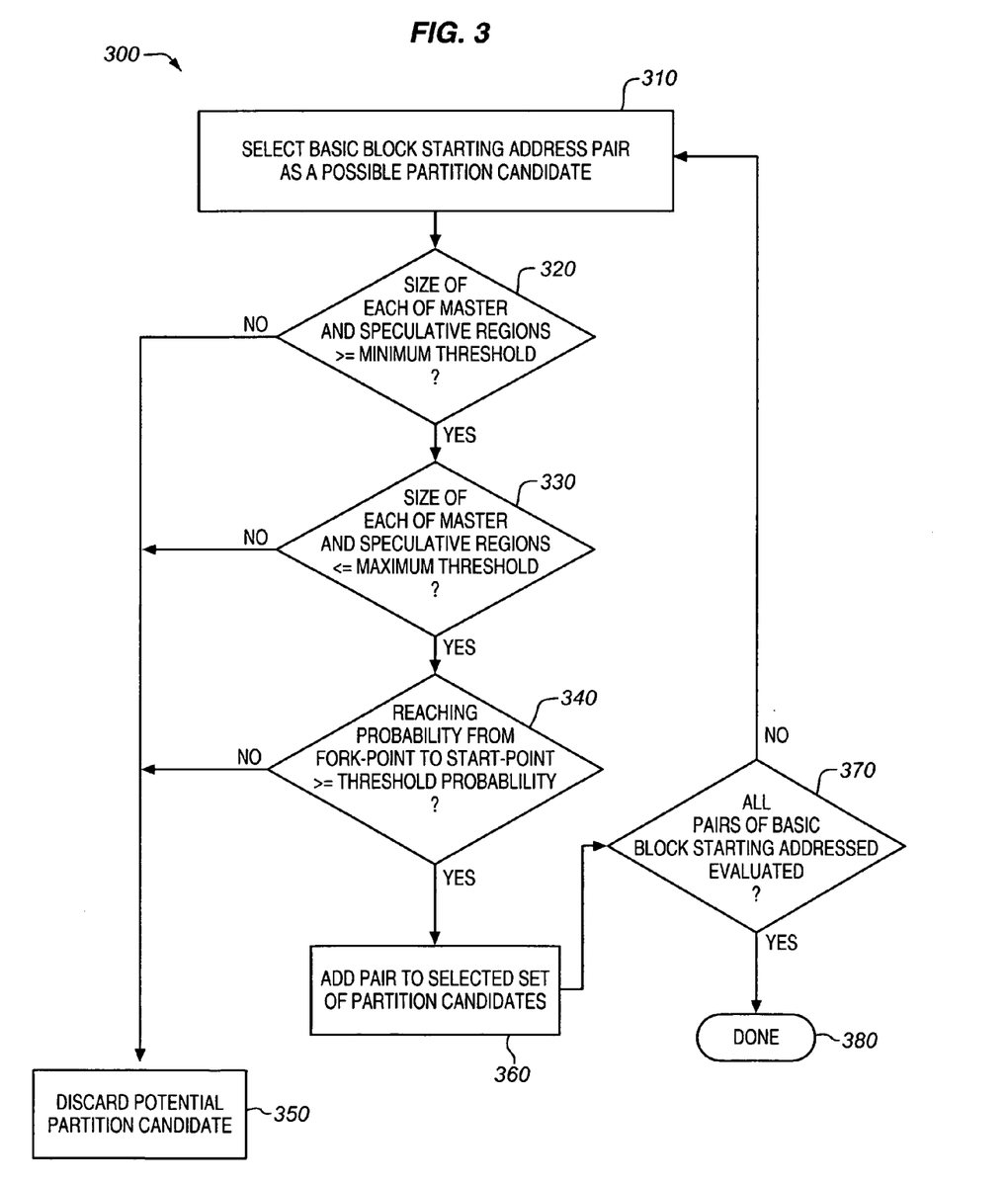
FIG. 3 illustrates a flow diagram of one embodiment of a method to pre-select partition candidates.

FIG. 3 is a flow diagram illustrating one embodiment of a process to select partition candidate pairs from a sequential code flow. In embodiments of the invention, starting addresses of basic blocks are selected as the candidates for F and S. If necessary, a large basic block may be split into several smaller ones.

The process 300 of FIG. 3 is used to identity potential partition candidate pairs that may be used to optimize SPT execution. The process 300 begins at processing block 310 where a pair of starting basic blocks addresses is selected to be analyzed as a possible partition candidate pair. At decision block 320, the compiler determines whether the size of the master and the speculative regions are greater than or equal to a minimum threshold. This criterion is implemented because there is some overhead to fork a thread and to commit the results of a thread. The size of a speculative thread should be large enough so that the performance gain could at least offset the overhead. If the size of the master and speculative regions do not exceed or equal the minimum threshold, then the partition candidate pair is discarded at processing block 350.

If the sizes do exceed or equal the minimum threshold, the process continues to decision block 330. At decision block 330, the compiler determines whether the size of the master region and speculative region are less than or equal to a maximum threshold. The size of the master and speculative regions may be constrained due to the limited hardware resources such as the size of the buffer to hold the results of a speculative thread. If the size of the master and speculative regions are not less than or equal to the maximum threshold, then the partition candidate pair is discarded at processing block 350.

If the sizes are less than or equal to the maximum threshold, the process continues to decision block 340. At decision block 340, the compiler determines if the reaching probability from F to S exceeds a threshold probability (e.g., >=90%). When the reaching probability is small, it means that the code of the speculative region is not likely to be executed by the main thread in normal execution. Therefore, the results of a speculative thread are likely to be useless. If the reaching probability from F to S does not exceed or equal the threshold probability, then the partition candidate pair is discarded at processing block 350.

However, if the partition pair does exceed or equal the threshold probability, then the pair is added to a selected set of partition candidates at processing block 360 that will later be transformed. The process continues to decision block 370, where it is determined whether all pairs of starting basic block addresses have been evaluated. If not the process continues with processing block 310 where another pair of addresses is selected. If all pairs have been analyzed, then the process ends at processing block 380 with a set of selected partition candidate pairs.

In one embodiment, the code of each partition candidate chosen during the selection process 300 is transformed or optimized to maximize the expected performance gain during a transformation phase. Any optimization and/or transformation algorithm known to those skilled in the art may be used to improve the expected performance gain of a partition candidate. The following is one embodiment of transforming and optimizing a partition candidate.

In one embodiment, a basic approach to transform and optimize is to form a small pre-fork region at the beginning of the master region to reduce the data dependences from the remaining portion of the master region ("post-fork region") to the speculative region. The pre-fork region may be formed by moving instructions in the lower portion of the master region above the fork instruction. If most (or all) of the code that the speculative region is dependent on is moved into a small pre-fork region, the dependences between the master and speculative threads may be reduced.

Optimal transformation of the code creates a small pre-fork region with a size no larger than a maximum threshold, so that the re-execution ratio of the speculative region with respect to the master post-fork region will be minimized. Any correct code movement may observe all data dependences within the master region. For write-after-read and write-after-write dependences of scalar variables, temporary variables may be introduced to break the dependences. This may allow more code to be moved into the pre-fork region.

FIG. 4 illustrates one embodiment of pseudo code that may be implemented to transform and optimize the pre-selected partition candidate pairs. Initially, a "violation candidate" is defined. The source of any read-after-write dependence from the master region to the speculative region is called a violation candidate. If a violation candidate is executed after fork, its dependent code in the speculation region will be speculatively executed incorrectly and need to be re-executed. To reduce re-execution ratio, most violation candidates should be moved into the pre-fork region and executed before the fork.

Figure 5:
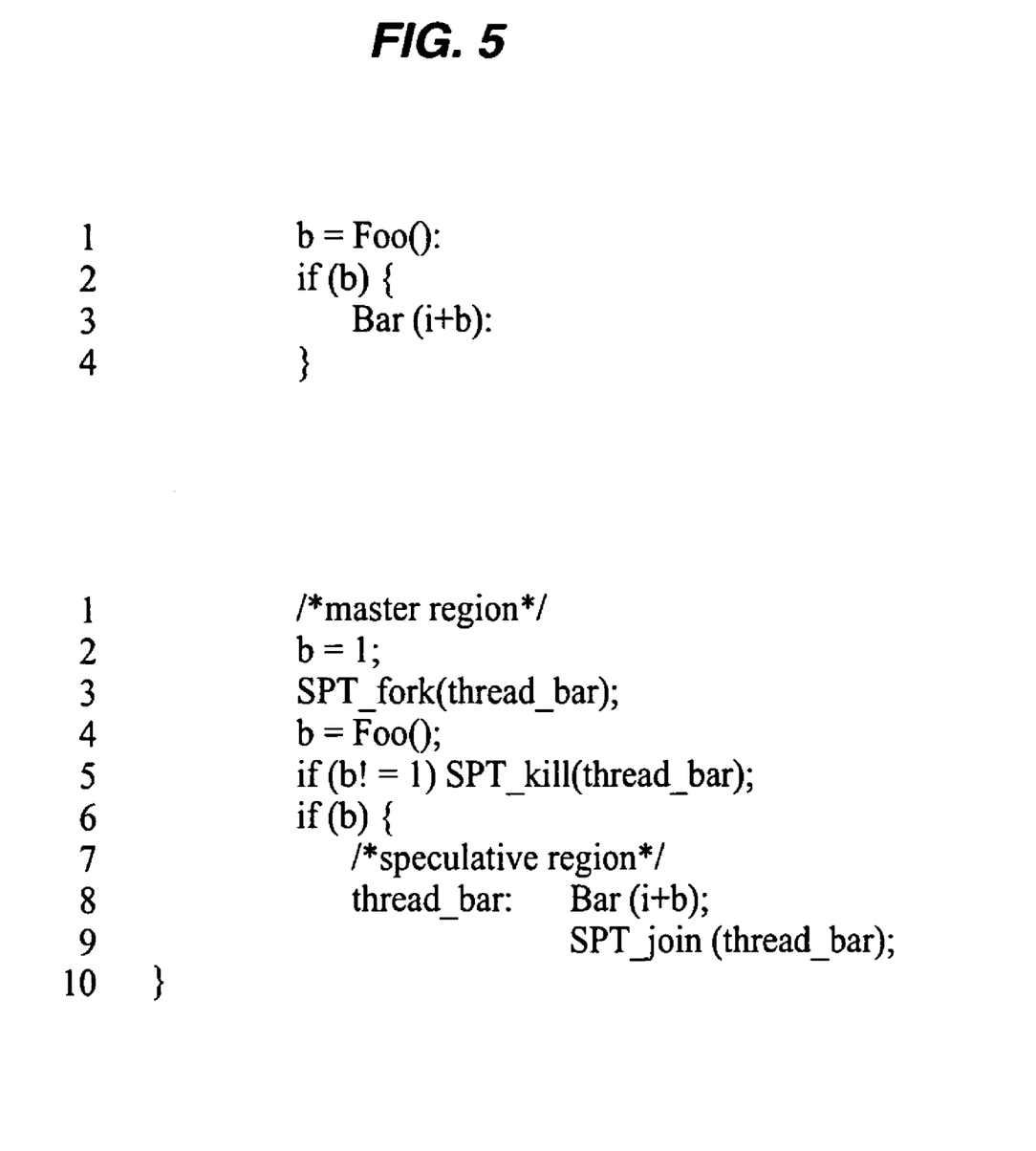
FIG. 5 illustrates one embodiment of pseudo-code transformed for optimal speculative parallel execution.

FIG. 5 illustrates one embodiment of pseudo-code of a partition candidate that has been transformed according to a process such as that depicted in FIG. 4. The code has been transformed with the expectation that the return value for "Foo( )" is 1 most, if not all, of the time.

In one embodiment, to facilitate the code movement of a violation candidate and its depending code into the pre-fork region, a directed acyclic graph may be formed with vertices as violation candidates and edges as the dependences between the violation candidates. Such a directed acyclic graph is known as a "VC dependence graph", where VC stands for violation candidate. During optimal code re-ordering, a vertex in the VC dependence graph is selected to consider if it should be moved into the pre-fork region.

When a vertex in the VC dependence graph is moved into the pre-fork region, all code in the master region that it is depending on should be moved into the pre-fork region too. A legal partition of the VC dependence graph corresponds to a legal partition of the master region into pre-fork and post-fork regions. In one embodiment, a branch and bound algorithm is utilized in FIG. 4 to search and evaluate all legal partitions of the VC dependence graph and find an optimal partition that has the smallest re-execution ratio.

The following model and formula is used to calculate the expected performance gain from SPT execution after the partition candidate has been optimized (i.e., after the procedure depicted and described with respect to FIG. 4). One skilled in the art will appreciate that other performance models and formulae may be used for other SPT execution models and program characteristics. The average instruction per cycle (IPC) is assumed to be uniform across the master region and speculative region, during both normal execution and re-execution. Assume that L is the size of master region in cycles, ipc is the IPC of the code, M is the maximum IPC when replaying the results without re-execution, F is the overhead to fork a thread in cycles, and r is the re-execution ratio. The expected performance gain (EPG) is:

$$EPG=L*(1-ipc/M)*(1-r)-F$$

In one embodiment, the global selection phase selects the set of non-interfering partition candidates with the maximal total performance gain. Two partition candidates (F, S) and (F', S') are said to be interfering with each other if either F is in the master or speculative regions of (F', S') or F' is in the master or speculative regions of (F, S). Two partition candidates that interfere with each other will not be selected at the same time because such a selection engenders problems in optimal partitions of master and speculative regions. One skilled in the art will appreciate that the definition for interfering partition candidates may be different for other SPT execution models.

Figure 6:
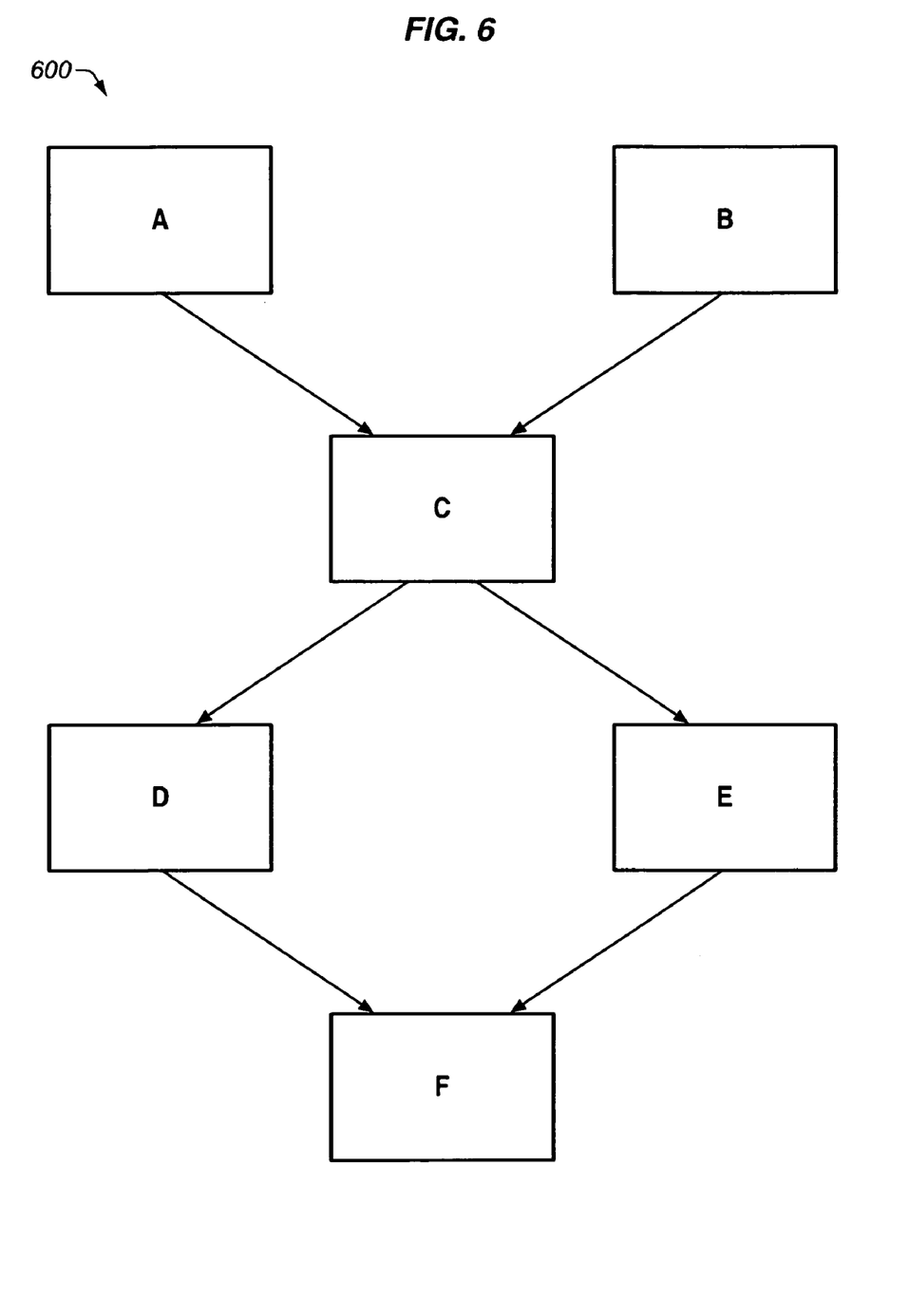
FIG. 6 illustrates one embodiment of a control-flow graph.

FIG. 6 illustrates one embodiment of a control-flow graph 600. In control-flow graph 600, vertices A-F represent individual blocks of instructions, and the edges between the vertices represent possible code-flow between the instruction blocks. Control-flow graph 600 may be used to determine interfering partition candidates. For example, (A, C) and (B, C) are not interfering because it is possible to place a fork instruction in A and in B such that a speculative thread starts at C. (A, D) and (C, D) are interfering because if a fork instruction is placed in the master region of (C, D) (i.e., in block C), the fork instruction will be in the master region of (A, D) (e.g., blocks A and C). Similarly, (C, D) and (C, E) are interfering. (A, C) and (D, F) may also be interfering if D happens to be in the speculative region of (A, C). This is possible when the size of the master region of (A, C) is larger than that of block C. In this case, the speculative region of (A, C) may include C and at least part of D and E.

Figure 7:
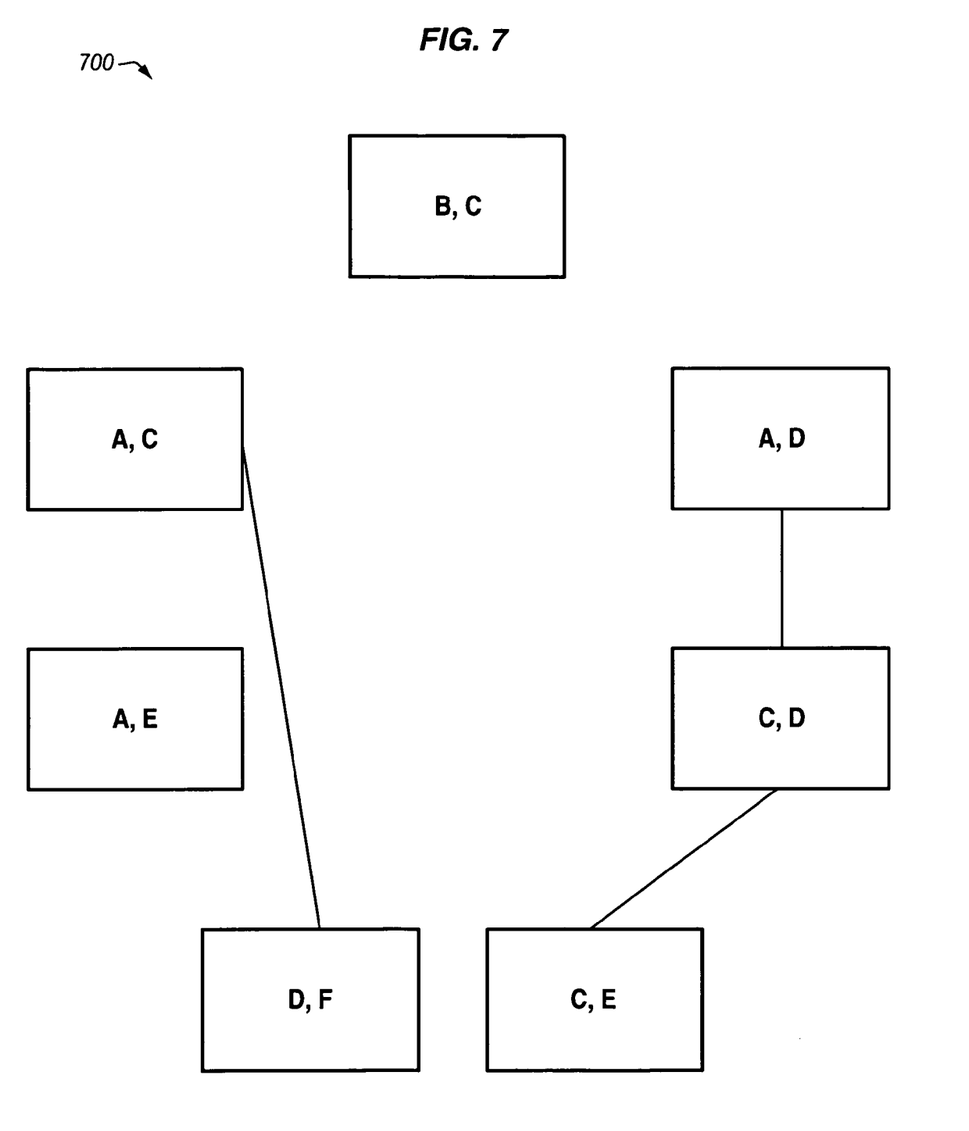
FIG. 7 illustrates one embodiment of a Violation Candidate (VC) interference graph.

In one embodiment, in order to do a global selection of the set of partition candidates for optimal overall performance gain, a partition candidate (PC) interference graph should be built based on the control-flow graph of the code. FIG. 7 illustrates one embodiment of a partition candidate interference graph 700. This graph 700 may be built as follows. Each (F, S) partition candidate is a vertex in the graph.

When two candidates interfere, an edge will be added between the corresponding vertices in the graph. For each (F, S) pair or partition candidate, the optimal expected performance gain (EPG) of the candidate computed from step (2) above is assigned to be the weight of the corresponding vertex. It should be noted that the partition candidate interference graph 700 does not include all set of interfering and non-interfering pair possibilities. Rather, graph 700 depicts an exemplary subset of some of the pair possibilities.

In one embodiment, once the PC interference graph is constructed the disjoint set of non-interfering vertices of the PC interference graph with maximal total weight should be found. The dual of this problem is to find all the non-selected candidates (i.e., all partition candidates that interfere with the remaining selected candidates) that carry the minimum total weight. If a non-selected candidate does not interfere with the selected candidate it can be selected to increase the total weight of the selected candidates.

In other words, the dual of the problem is to find a vertex cover of the PC interference graph with minimal total weight. The vertex cover is a set of vertices that touches all edges in the graph. This is well-known in the art as the Minimal (Weighted) Vertex Covering problem. After obtaining a minimal weighted vertex cover, the set of vertices not in the cover gives an optimal set of partition candidates with maximum overall expected performance gain. Embodiments allow any of the algorithms solving the minimal weighted vertex covering problem to be used once the PC interference graph is formed.

Speculative parallel threading is a technology that exploits thread-level parallelism on multi-threaded architectures or multi-chip processors. Embodiments of the invention provide for an implementation of compiler support to generate optimal code to fully exploit such a technology. In particular, embodiments may be applied to arbitrary control flows versus restricted control flows (e.g., loops). Maximally speculatively parallel threading programs may then be generated to deliver high performance.

Figure 8:
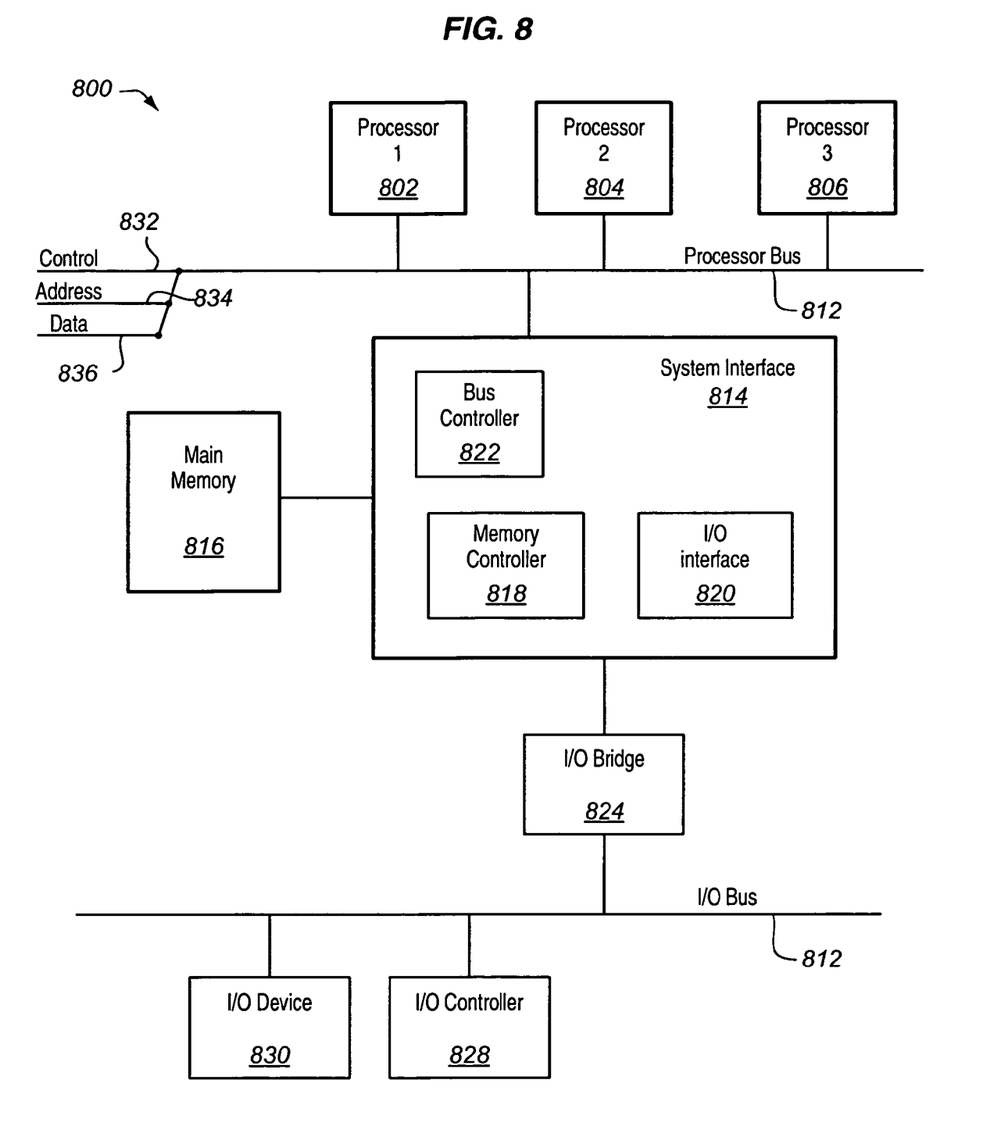
FIG. 8 illustrates a block diagram of an exemplary computer system used in implementing one or more embodiments of the invention.

FIG. 8 is a block diagram illustrating an exemplary computer system 800 used in implementing one or more embodiments of the invention. The computer system (system) 800 includes one or more processors 802-806. The processors 802-806 may include one or more single-threaded or multi-threaded processors. A typical multi-threaded processor may include multiple threads or logical processors, and may be capable of processing multiple instruction sequences concurrently using its multiple threads. Processors 802-806 may also include one or more internal levels of cache (not shown) and a bus controller or bus interface unit to direct interaction with the processor bus 812. As in the case of chip multiprocessors or multi-core processors, processors 802-806 may be on the same chip. The chip may include shared caches, interprocessor connection network and special hardware support such as those for SPT execution (not shown).

Processor bus 812, also known as the host bus or the front side bus, may be used to couple the processors 802-806 with the system interface 814. Processor bus 812 may include a control bus 832, an address bus 834, and a data bus 836. The control bus 832, the address bus 834, and the data bus 836 may be multi-drop bi-directional buses, e.g., connected to three or more bus agents, as opposed to a point-to-point bus, which may be connected only between two bus agents.

System interface 814 (or chipset) may be connected to the processor bus 812 to interface other components of the system 800 with the processor bus 812. For example, system interface 814 may include a memory controller 818 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. For example, as illustrated, the I/O interface 820 may interface an I/O bridge 824 with the processor bus 812. I/O bridge 824 may operate as a bus bridge to interface between the system interface 814 and an I/O bus 826. One or more I/O controllers and/or I/O devices may be connected with the I/O bus 826, such as I/O controller 828 and I/O device 830, as illustrated. I/O bus 826 may include a peripheral component interconnect (PCI) bus or other type of I/O bus.

System 800 may include a dynamic storage device, referred to as main memory 816, or a random access memory (RAM) or other devices coupled to the processor bus 812 for storing information and instructions to be executed by the processors 802-806. Main memory 816 may also be used for storing temporary variables or other intermediate information during execution of instructions by the processors 802-806. System 800 may include a read only memory (ROM) and/or other static storage device coupled to the processor bus 812 for storing static information and instructions for the processors 802-806.

Main memory 816 or dynamic storage device may include a magnetic disk or an optical disc for storing information and instructions. I/O device 830 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. I/O device 830 may also include an input device (not shown), such as an alphanumeric input device, including alphanumeric and other keys for communicating information and/or command selections to the processors 802-806. Another type of user input device includes cursor control, such as a mouse, a trackball, or cursor direction keys for communicating direction information and command selections to the processors 802-806 and for controlling cursor movement on the display device.

System 800 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 800 may be coupled with a number of clients and/or servers via a conventional network infrastructure, such as a company's Intranet and/or the Internet, for example.

It is appreciated that a lesser or more equipped system than the example described above may be desirable for certain implementations. Therefore, the configuration of system 800 may vary from implementation to implementation depending upon numerous factors, such as price constraints, performance requirements, technological improvements, and/or other circumstances.

It should be noted that, while the embodiments described herein may be performed under the control of a programmed processor, such as processors 802-806, in alternative embodiments, the embodiments may be fully or partially implemented by any programmable or hardcoded logic, such as field programmable gate arrays (FPGAs), transistor transistor logic (TTL) logic, or application specific integrated circuits (ASICs). Additionally, the embodiments of the invention may be performed by any combination of programmed general-purpose computer components and/or custom hardware components. Therefore, nothing disclosed herein should be construed as limiting the various embodiments of the invention to a particular embodiment wherein the recited embodiments may be performed by a specific combination of hardware components.

In the above description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the invention. It will be appreciated, however, to one skilled in the art that the embodiments of the invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

The various embodiments of the invention set forth above may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the invention may be provided as a computer program product, which may include a machine-readable medium having stored thereon instructions, which may be used to program a computer (or other electronic devices) to perform a process according to various embodiments of the invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions.

Similarly, it should be appreciated that in the foregoing description, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Whereas many alterations and modifications of the invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method for speculative parallel thread compilation and execution of program code, comprising:
    selecting, by a processor of a computing device, a plurality of partition candidate pairs of the program code for speculative parallel thread execution, wherein selecting the plurality of partition candidate pairs includes the plurality of partition candidate pairs whose reaching probabilities is high and exceeds a minimum threshold;
    transforming, by the processor, each partition candidate pair of the plurality of partition candidate pairs by altering the program code to improve an expected performance gain of each pair, wherein the program code of the plurality of partition candidate pairs is transformed in both master and speculative regions to reduce re-execution cost, wherein the transformation of each partition candidate pair is determined by estimation of a re-execution ratio, where the re-execution ratio is a probability that a speculatively executed instruction in the speculative region needs to be re-executed, where the re-execution ratio is estimated by dividing an expected number of instructions in the speculative region to be re-executed by an expected total number of instructions executed in the speculative region; and
    selecting, by the processor, a set of one or more transformed partition candidate pairs that do not interfere with each other and produce a maximum expected performance gain.

2. The method of claim 1, wherein each partition candidate pair comprises:
    a start-point that is a starting instruction of a speculative parallel thread; and
    a fork-point to initiate speculative parallel execution of the speculative parallel thread.

3. The method of claim 2, wherein a section of code between the fork-point and start-point is the master region, and a section of code subsequent to the start-point until joining the master region is the speculative region.

4. The method of claim 3, wherein selecting the plurality of partition candidate pairs further comprises selecting the partition candidate pairs that satisfy the following criteria:
    a size of each of the master and speculative regions is greater than or equal to a minimum threshold related to an overhead to execute the speculative region;
    the size of each of the master and speculative regions is less than or equal to a maximum threshold related to a size of a buffer that holds execution results of the speculative region; and
    a reaching probability from the fork-point to the start-point is greater than or equal to a threshold probability.

5. The method of claim 3, wherein transforming each partition candidate pair further comprises moving instructions of the master region before the fork point to reduce dependency violations between the master and speculative regions.

6. The method of claim 5, wherein a directed acyclic graph is utilized to move the instructions.

7. The method of claim 1, wherein selecting the set of one or more transformed partition candidate pairs further comprises:
    generating an interference graph, wherein each vertex in the graph is a partition candidate pair and each edge in the graph connects interfering partition candidate pairs;

determining a disjoint set of non-interfering vertices with a maximum total weight, wherein the weight of each vertex is the expected performance gain of the partition candidate pair; and selecting those vertices in the disjoint set.

8. The method of claim 7, wherein determining the disjoint set of vertices further comprises:

obtaining a minimum weighted vertex cover; and selecting those vertices not in the vertex cover.

9. The method of claim 1, wherein selecting the plurality of partition candidate pairs, transforming each partition candidate pair, and selecting the set of one or more transformed partition candidate pairs are each performed by a compiler.

10. A machine-accessible medium having stored thereon data representing sets of instructions that, when executed by a machine, cause the machine to perform operations for speculative parallel thread compilation and execution of program code comprising:

selecting a plurality of partition candidate pairs for speculative parallel thread execution, wherein selecting the plurality of partition candidate pairs includes the plurality of partition candidate pairs whose reaching probabilities is high and exceeds a minimum threshold;

transforming each partition candidate pair of the plurality of partition candidate pairs by altering the program code to improve an expected performance gain of each pair, wherein the program code of the plurality of partition candidate pairs is transformed in both master and speculative regions to reduce re-execution cost, wherein the transformation of each partition candidate pair is determined by estimation of a re-execution ratio, where the re-execution ratio is a probability that a speculatively executed instruction in the speculative region needs to be re-executed, where the re-execution ratio is estimated by dividing an expected number of instructions in the speculative region to be re-executed by an expected total number of instructions executed in the speculative region; and selecting a set of one or more transformed partition candidate pairs that do not interfere with each other and produce a maximum expected performance gain.

11. The machine-accessible medium of claim 10, wherein each partition candidate pair comprises:

a start-point that is a starting instruction of a speculative parallel thread; and a fork-point to initiate speculative parallel execution of the speculative parallel thread.

12. The machine-accessible medium of claim 11, wherein a section of code between the fork-point and start-point is the master region, and a section of code subsequent to the start-point until joining the master region is the speculative region.

13. The machine-accessible medium of claim 12, wherein selecting the plurality of partition candidate pairs further comprises selecting the partition candidate pairs that satisfy the following criteria:

a size of each of the master and speculative regions is greater than or equal to a minimum threshold related to an overhead to execute the speculative region;

the size of each of the master and speculative regions is less than or equal to a maximum threshold related to a size of a buffer that holds execution results of the speculative region; and a reaching probability from the fork-point to the start-point is greater than or equal to a threshold probability.

14. The machine-accessible medium of claim 12, wherein transforming each partition candidate pair further comprises moving instructions to reduce dependency violations between the master and speculative regions.

15. The machine-accessible medium of claim 14, wherein a directed acyclic graph is utilized to move the instructions.

16. The machine-accessible medium of claim 10, where selecting the plurality of partition candidate pairs, transforming each partition candidate pair, and selecting the set of one or more transformed partition candidate pairs are performed by a compiler.

17. A system for speculative parallel thread compilation and execution of program code, comprising:

a dynamic random access memory (DRAM) to store the program code; and a processor coupled with the DRAM memory, the processor to:

select a plurality of partition candidate pairs for speculative parallel thread execution, wherein selecting the plurality of partition candidate pairs includes the plurality of partition candidate pairs whose reaching probabilities is high and exceeds a minimum threshold;

transform each partition candidate pair of the plurality of partition candidate pairs by altering the program code to improve an expected performance gain of each pair, wherein the program code of the plurality of partition candidate pairs is transformed in both master and speculative regions to reduce re-execution cost, wherein the transformation of each partition candidate pair is determined by estimation of a re-execution ratio, where the re-execution ratio is a probability that a speculatively executed instruction in the speculative region needs to be re-executed, where the re-execution ratio is estimated by dividing an expected number of instructions in the speculative region to be re-executed by an expected total number of instructions executed in the speculative region; and select a set of one or more transformed partition candidate pairs that do not interfere with each other and produce a maximum expected performance gain.

18. The system of claim 17, wherein to select the set of one or more transformed partition candidate pairs further comprises:

generating an interference graph, wherein each vertex in the graph is a partition candidate pair and each edge in the graph connects interfering partition candidate pairs;

determining a disjoint set of non-interfering vertices with a maximum total weight, wherein the weight of each vertex is the expected performance gain of the partition candidate pair; and selecting those vertices in the disjoint set.

19. The system of claim 18, wherein determining the disjoint set of vertices further comprises:

obtaining a minimum weighted vertex cover; and selecting those vertices not in the vertex cover.

20. The system of claim 17, wherein to select the plurality of partition candidate pairs, to transform each partition candidate pair, and to select the set of one or more transformed partition candidate pairs are each performed by a compiler.

* * * * *